(12) United States Patent
Andersson

(10) Patent No.: US 10,343,703 B2
(45) Date of Patent: Jul. 9, 2019

(54) SELF-PROPELLING TROLLEY ASSEMBLY

(71) Applicant: Kyttinge Investment AB, Lidingö (SE)

(72) Inventor: Roland Andersson, Lidingö (SE)

(73) Assignee: Kyttinge Investment AB, Lidingö (SE)

(*) Notice: Subject to any disclaimer, the term of this patent is extended or adjusted under 35 U.S.C. 154(b) by 0 days.

(21) Appl. No.: 15/754,344

(22) PCT Filed: Apr. 4, 2017

(86) PCT No.: PCT/SE2017/050338
§ 371 (c)(1),
(2) Date: Feb. 22, 2018

(87) PCT Pub. No.: WO2017/176202
PCT Pub. Date: Oct. 12, 2017

(65) Prior Publication Data
US 2018/0281838 A1 Oct. 4, 2018

(30) Foreign Application Priority Data
Apr. 5, 2016 (SE) ...................... 1650459

(51) Int. Cl.
*B62B 7/00* (2006.01)
*B62B 5/00* (2006.01)
(Continued)

(52) U.S. Cl.
CPC .............. *B62B 5/0036* (2013.01); *B60L 3/08* (2013.01); *B60L 15/20* (2013.01); *B60L 15/30* (2013.01);
(Continued)

(58) Field of Classification Search
CPC ....... B62B 5/0076; B62B 7/00; B62B 5/0036; B62B 5/00; B60L 15/20; B60L 3/08; B60L 11/1803
See application file for complete search history.

(56) References Cited

U.S. PATENT DOCUMENTS 5,937,961 A  8/1999 Davidson
6,000,486 A  12/1999 Romick et al.
(Continued)

FOREIGN PATENT DOCUMENTS

DE  102008039599 A1  3/2010
DE  102013009068 A1  11/2013
(Continued)

OTHER PUBLICATIONS

Extended European Search Report from corresponding European Application No. 17779444.3, dated Jul. 30, 2018.
(Continued)

*Primary Examiner* — Hau V Phan
(74) *Attorney, Agent, or Firm* — Tucker Ellis LLP

(57) ABSTRACT

A self-propelling trolley assembly has a battery; a wheel driven by an electric motor that is powered by the battery; a rotation position or velocity sensor arranged to sense a rotation position or rotation velocity of the wheel; a user interface; and a control unit to affect a rotation of the wheel according to particular drive modes including a feedback assisted propulsion drive mode; a free-wheeling drive mode; and a rocking drive mode. The drive modes are implemented using different drive voltage patterns to the electric motor, and a stator of the electric motor has a number of stator poles that are not an integer multiple of a number of rotor poles and the stator poles are grouped into at least three magnetically and electrically identical subsets that are mounted sequentially around an angular direction of the electric motor.

15 Claims, 2 Drawing Sheets

(51) Int. Cl.
 *B62B 7/04* (2006.01)
 *B62B 9/22* (2006.01)
 *B60L 3/08* (2006.01)
 *B60L 15/20* (2006.01)
 *B60L 15/30* (2006.01)
 *B62B 9/00* (2006.01)
 *B60L 50/51* (2019.01)
 *B62B 9/08* (2006.01)
 *B62B 5/04* (2006.01)

(52) U.S. Cl.
 CPC ............... *B60L 50/51* (2019.02); *B62B 7/04* (2013.01); *B62B 9/00* (2013.01); *B62B 9/22* (2013.01); *B60L 2200/30* (2013.01); *B60L 2240/461* (2013.01); *B62B 5/0043* (2013.01); *B62B 5/0069* (2013.01); *B62B 5/0404* (2013.01); *B62B 9/08* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| | | | |
|---|---|---|---|
| 6,148,942 A | 11/2000 | Mackert | |
| 7,210,545 B1 * | 5/2007 | Waid | B60K 7/0007 180/19.1 |
| 7,475,611 B2 * | 1/2009 | Yang | B60K 7/0007 180/65.51 |
| 8,033,348 B1 | 10/2011 | Parkhe | |
| 8,499,898 B2 | 8/2013 | Thorne | |
| 9,027,689 B1 | 5/2015 | Brien et al. | |
| 9,186,992 B2 * | 11/2015 | Katayama | B62D 51/04 |
| 2009/0120736 A1 | 5/2009 | Masterson et al. | |
| 2013/0277941 A1 | 10/2013 | James et al. | |
| 2015/0025660 A1 | 1/2015 | Prassler et al. | |
| 2015/0144411 A1 * | 5/2015 | Washington | B62B 5/0076 180/167 |
| 2016/0009169 A1 * | 1/2016 | Biderman | B60L 15/20 701/22 |

FOREIGN PATENT DOCUMENTS

| | | |
|---|---|---|
| EP | 0291219 A2 | 11/1988 |
| EP | 0678968 A2 | 10/1995 |
| EP | 0996217 A1 | 4/2000 |
| EP | 2019016 A2 | 1/2009 |
| EP | 2851054 A1 | 3/2015 |
| WO | 2014013482 A1 | 1/2014 |
| WO | 2014070008 A2 | 5/2014 |
| WO | 2015107713 A1 | 7/2015 |
| WO | 2015154046 A1 | 10/2015 |

OTHER PUBLICATIONS

Morro, Guillermo, "Smartbe Intelligent Stroller", (2016), [retrieved online], <https://www.indiegogo.com/projects/smartbe-intelligent-stroller#/>.

International Search Report and Written Opinion from corresponding International Application No. PCT/SE2017/050338, dated Jun. 27, 2017.

* cited by examiner

SELF-PROPELLING TROLLEY ASSEMBLY

FIELD OF THE INVENTION

The present invention relates to a self-propelling trolley assembly, in particular a children's stroller or a transport trolley for liquid samples.

BACKGROUND

Users of trolleys frequently experience that their manoeuvring can be problematic. When pushing or pulling them uphill, or even when carrying heavy loads on a substantially flat surface, users may experience heavy stress. Likewise when pushing trolleys downhill, it may take considerable force to prevent the trolley from coming loose and picking up speed. Many times it is difficult or impossible to pull or push a trolley with the body in an ergonomically correct or non-hurting position, or the user of a trolley may not be strong enough to maintain such a position.

In particular for children's trolleys and transport trolleys for liquid samples, such as for use within the medical or pharmaceutical industries, the security risks are considerable if a user of such a trolley is unable to hold the trolley and it comes loose.

It is also desirable to be able to push or pull such a trolley using less effort in general, by the trolley being self-propelled to decrease the necessary pushing force.

For children's trolleys and transport trolleys for liquid samples, there is also a desire to be able to rock the transported child or liquid samples—in the former case in order to sooth the child, in the latter for instance to keep the samples from settling. It is desirable that such rocking is possible using different rocking programs, so that a suitable rocking movement can be selected depending on the circumstances.

Concurrently, there is a need to provide a disengaged, free-wheeling operation mode, in which the trolley acts as a conventional non-motorized, wheeled trolley, for instance when the user wishes to have more exercise, or when manoeuvring in small spaces.

All these aims should be achieved using a simple, robust yet energy-efficient construction, offering both flexibility and the highest security standards, at the same time as the trolly assembly should be environmentally friendly and cost-efficient to produce.

Numerous self-propelled trolleys have been proposed, offering solutions to subsets of said problems. Some of these include U.S. Pat. No. 8,499,898 B2, disclosing a children's trolley with a speed control; WO 2014013482 A1, disclosing a rocking functionality for use with a children's trolley; U.S. Pat. Nos. 5,937,961 and 8,033,348 B1, disclosing a respective disconnectable motor for a trolley; and EP 2019016 A2, showing a motor arranged at a driven shaft.

BRIEF SUMMARY OF THE INVENTION

The present invention solves the above described problems.

Hence, the invention relates to a self-propelling trolley assembly, comprising a battery; at least one wheel which is driven by an electric motor, which electric motor is powered by said battery; a rotation position or velocity sensor arranged to sense a rotation position or rotation velocity of at least one trolley wheel; a user interface; and a control unit arranged to regulate the electric motor based upon input from said user interface so as to affect a rotation of said wheel according to particular drive patterns, which trolley assembly is characterised in that the control unit is arranged to implement at least a feedback assisted propulsion drive pattern, based upon information read from said position or velocity sensor; a free-wheeling drive pattern; and a rocking drive pattern, in that all of said drive patterns are implemented using different drive voltage patterns to said electric motor, and in that the electric motor is of a type in which the stator comprises a number of stator poles which is not an integer multiple of a corresponding number of rotor poles and in which the stator poles are subdivided into at least three magnetically and electrically identical subsets that are mounted one after the other around the angular direction of the electric motor.

BRIEF DESCRIPTION OF THE SEVERAL VIEWS OF THE DRAWINGS

In the following, the invention will be described in detail, with reference to exemplifying embodiments of the invention and to the enclosed drawings, wherein.

DETAILED DESCRIPTION OF THE INVENTION

The present invention makes use of a particular type of electrical motor, namely a brushless electric motor with a stator comprising a number of stator poles and a rotor comprising a number of rotor poles. In this type of motor, the stator comprises a number of stator poles which is not an integer multiple of a corresponding number of rotor poles, and the stator poles are subdivided into at least three magnetically and electrically identical subsets that are mounted one after the other around the angular direction of the electric motor. Preferably, the stator poles are equidistantly arranged along a stator periphery. Correspondingly, the rotor poles are preferably equidistantly arranged along a rotor periphery.

Preferably, the motor is arranged to directly drive a respective wheel of the trolley. For instance, the motor can be mounted on a wheel axis and drive a wheel in relation to said axis, in which case two, preferably substantially identical, motors can be mounted on either side of the axis, driving one respective wheel each. In this case, it is desired that the below-described feedback control mechanism is performed individually on each such driven wheel, using position sensor data pertaining to the respective wheel in question, providing adequate auto-propulsion also when turning the trolley. Alternatively, a motor of said type can be mounted to drive a wheel axis in turn propelling two wheels at the same time. Wheels on more than one wheel axis may also be driven, in the corresponding manner. Hence, it is foreseen that between 1 and at least 4 motors can be used with one trolley. Preferably, all motors are controlled by, and communicate with, the same control unit (see below).

The present inventors have discovered that the use of such an electric motor for propelling a trolley assembly of the present type achieves a number of advantages.

Firstly, such a motor provides very low cogging of the motor, which provides for a smooth rotation of the wheel.

Secondly, the motor can be precisely controlled, based upon a feedback algorithm taking into consideration rotation positional feedback from the motor itself, across a broad spectrum of rotation velocities and patterns.

Thirdly, the motor allows being used as a generator for motor braking the trolley while recharging the battery using the generated current.

Fourthly, the motor also allows for a free-wheeling function as described herein below.

At the same time, there are many types of electrical motors that are as such in general suitable for use in a self-propelled trolley assembly, such as a conventional stepping motor or a conventional brushless motor of any other type. The present inventors have discovered that, in contrast thereto, a motor of said specific type is particularly well-suited for the various trolley functionality described herein, and provides a very simple yet robust construction with a minimum of movable parts and wear details.

Figure 1:
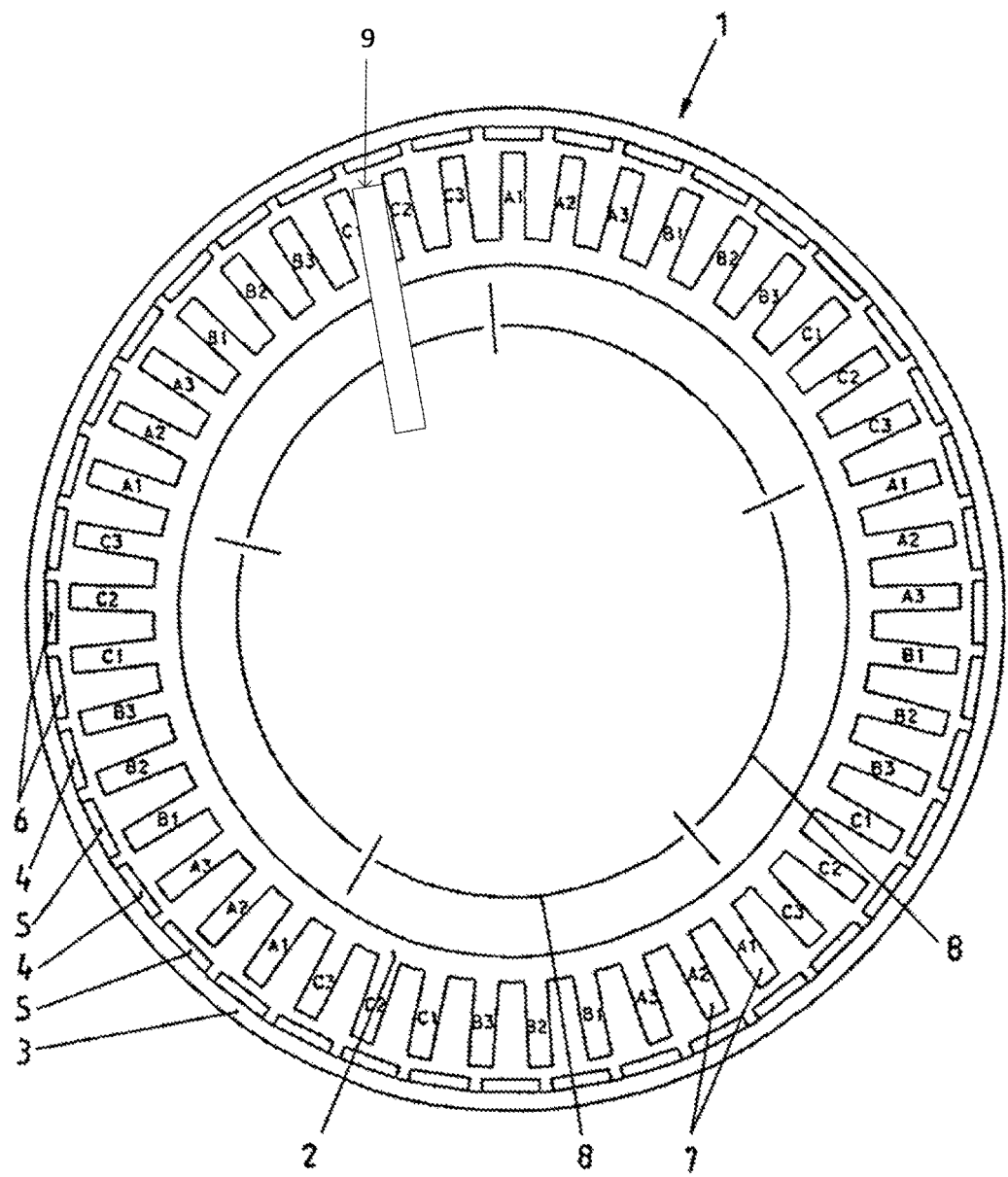
FIG. 1 is a schematic side view of a motor in a trolley assembly according to the invention.
Figure 2:
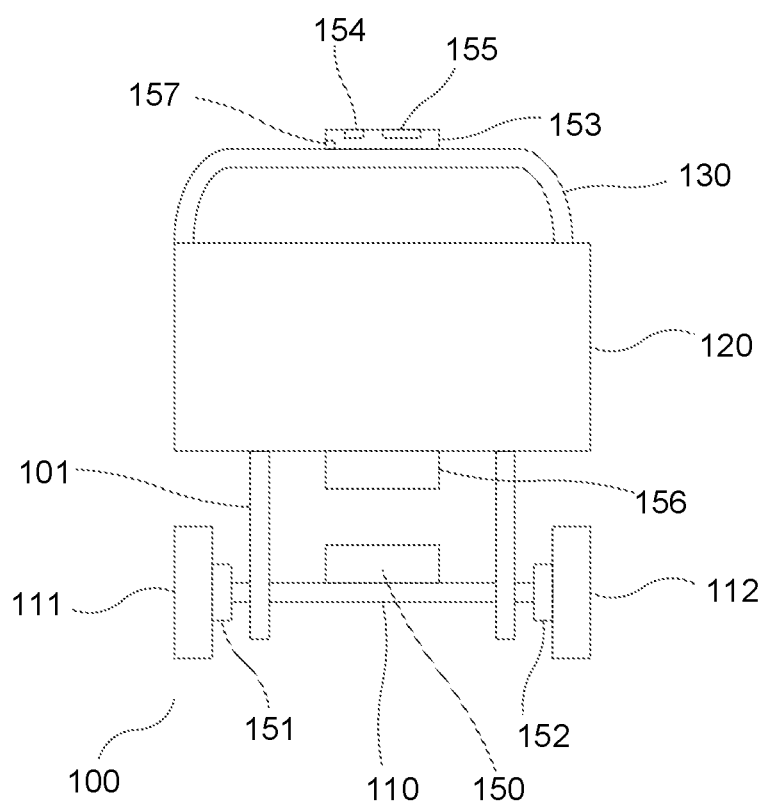
FIG. 2 is an overview of a trolley according to the invention.

A motor of the above described type is, as such, known from EP 0996217 B1, which is specifically referred to herein for information pertaining to the motor as such. FIG. 2 of EP 0996217 B1, which is also shown, in an edited version, as FIG. 1 of the present application, schematically illustrates such a motor 1, having a stator 2 and a rotor 3. In the figure, the rotor 3 surrounds the stator 2, it is however realized that the situation can also be the reversed.

The stator 2 is arranged with stator poles 7, and the rotor 3 is arranged with rotor poles 6. Between the poles 6, 7, there is a gap, such as an air gap, so that the poles 6, 7 do not physically come into contact with each other. This allows the motor 1 to turn substantially without friction.

The rotor poles 7 are divided into pairs of alternate south pole 4 and north pole 5 rotor poles, preferably in the form of permanent magnets.

The motor is preferably arranged to be fed with an alternating current, either using a motor-internal AC/DC converter or using such a converter arranged as a part of, or an external part controlled by, the control device (see below). In the exemplifying case shown in FIG. 1, the motor is a three-phase AC motor.

More precisely, the stator poles 7 are fed, by said AC/DC converter (which may comprise phase-shifting circuitry), with DC voltage according to the following:

| Pole reference | Phase |
|---|---|
| A1, A3 | 0° |
| A2 | 180° |
| B1, B3 | 120° |
| B2 | 300° |
| C1, C3 | 240° |
| C2 | 60° |

In general, in the document EP 0291219 A1, to which specific reference is made herein regarding the details of the pole arrangement and power feeding to the poles of the motor 1, it is described how to select such phase values, the number of stator poles 7 and the number of rotor poles 6.

All poles with the same reference (A1, A3, A2, etc.) can be connected in series or, preferably, in parallel.

What is important for the present purposes is that the stator 2 comprises a number of stator poles 7 (in the present case 45 poles 7) which is not an integer multiple of a corresponding number of rotor poles 6 (in the present case 40 poles 6), and that the stator poles 7 are subdivided into at least three magnetically and electrically identical subsets 8, or coherent zones, that are mounted one after the other around the angular direction of the motor 1. This can also be expressed so that the stator 2 is arranged with a five-fold rotation symmetry with respect to its poles 7. In FIG. 1, the subsets 8 are five of number, but it is realized that they can be more or fewer, as long as they are at least three.

The combination of using such different numbers of poles 6, 7, with arranging the stator poles 7 in such subsets 8, provides for low cogging in the motor 1 while supporting all the desired features of such a motor for the present purposes in a way which has proven very advantageous in practical tests by the inventors, especially in terms of efficiency, smoothness, noise levels and exactness.

Furthermore, the motor 1 supports using a hall position sensor 9, schematically illustrated in FIG. 1. The position sensor 9 may be arranged to sense the rotation position of the motor, or comprise logic so as to provide a value for the current rotation velocity directly.

FIG. 2 illustrates, in a simple overview, a trolley 100 according to the present invention. As mentioned above, the trolley 100 may be a children's trolley or stroller, alternatively be a transport trolley for liquid samples, such as biological or chemical test tube samples for use within the medical, pharmaceutical or biochemical fields. It is realized that, in the former case, a main body 120 of the trolley 100 may comprise a child's seat or bed; and in the latter case, the main body 120 may comprise compartments for essay tubes or similar.

The trolley 100 constitutes a self-propelling trolley assembly according to the present invention, comprising a battery 156; at least one wheel axis 110 which is driven by at least one respective electric motor 151, 512, which electric motor(s) 151, 152 is or are powered by the battery 156. In FIG. 2, which is illustrated from the back of the trolley 100, only one wheel axis 110 is shown. It is realized, however, that typically two wheel axes will be present, each of which may be driven using one or two motors. As described above, one electric motor may also propel a whole axis 110.

The above described rotation position or velocity sensor 9 is preferably installed in at least one of said motors 151, 152, preferably in each motor 151, 152 so as to measure the position or velocity individually in said motors 151, 152, in the way described above, and is arranged to sense the rotation position or rotation velocity of at least one trolley 100 wheel 111, 112 or axis 110.

A user interface 153, preferably comprising a function switch 157, a dead man's switch 154 and a user velocity setting control 155, is preferably arranged on a handlebar 130 of the trolley 100. The dead man's switch 154 must preferably be held or pressed in for the trolley to be propelled using motor 151, 152 power, as described below. The velocity setting control 155, which may be a lever, a turnable handle or similar, is arranged to a allow the user to set a desired trolley 100 velocity, such as to a specific value within a continuous allowable interval or one value from a discreet set of predetermined such velocities.

The trolley 100 also comprises said main body 120 and a chassis 101.

A control unit 150 of the trolley 100 is arranged to regulate the electric motor 151, 152 based upon input from said user interface 153, so as to affect a rotation of said wheel or wheels 111, 112 according to particular one of a set of drive patterns, which drive patterns are preferably at least three of number.

More precisely, according to the present invention, the control unit 150 is arranged to implement at least a feedback assisted propulsion drive pattern, based upon information read from the said position or velocity sensor or sensors 9;

a free-wheeling drive pattern; and a rocking drive pattern. There may also be further drive patterns, as exemplified below.

Further according to the present invention, all of said drive patterns are implemented by the control unit 150 by controlling a voltage pattern being supplied to the electric motor 151, 152, so that different drive voltage patterns are provided to the electric motor 151, 152 for different drive patterns. Such drive voltage patterns are preferably implemented in software in a generally programmable hardware circuit arranged in the control unit 150, which hardware circuit comprises a memory, a micro processor and electrical communication means. It is realized that the control unit 150 communicates with user interface 153, motors 151, 152, and so on, using conventional communication means such as wireless or wired digital interfaces.

Importantly, the electric motor 151, 152, and in particularly all electric motors used to propel one or several of the trolley 100 wheels 111, 112 are of the above described type, in which the stator comprises a number of stator poles which is not an integer multiple of a corresponding number of rotor poles and in which the stator poles are subdivided into at least three magnetically and electrically identical subsets that are mounted one after the other around the angular direction of the electric motor 151, 152.

Such a trolley assembly offers a very simple and robust construction, which may still offer a flexible and broad flora of drive functionality and hence user comfort. At the same time, it is safe to use and can also easily be used as a conventional, non-driven trolley when so is desired. In particular, the motor 151, 152 does not require a gearbox, which is preferred.

According to a preferred embodiment, the position or velocity sensor 9 is a hall effect sensor, arranged to provide the control unit 150 with rotary motor position or velocity information.

As described above, the control unit 150 is arranged to implement a number of drive patterns of the trolley 100 by imparting forces to the trolley 100 wheels 111, 112 via said at least one electric motor 151, 152.

One such drive pattern is a user settable speed drive pattern. Preferably, in this pattern the user sets, via control 155, a desired trolley speed or velocity. When active, for instance by the said control 155 being set, and/or by a separate powercontrol being switched on, the control unit 110 will continuously measure a speed of the trolley 100, using sensor 9, and compare it to the said user-set speed by regulating a voltage supplied to the motor 151, 152 from the battery 156 according to a feedback loop so as to achieve said user-set speed or velocity. The user-set velocity may be specified using control 155 as a numerical value, such as "5 m/s", or by the user for instance selecting a value from "low", "medium", "fast", which value is then translated into a specific trolley 100 velocity.

This user settable speed drive pattern feedback loop preferably comprises raising the voltage supplied to each motor 151, 152 when the read velocity decreases and/or is below the user-set velocity and vice versa. Preferably, a control loop, such as a PID control loop, is implemented by the above mentioned software implemented in the control unit 150, which control loop aims at maintaining a trolley 100 velocity as close to the user-set velocity as possible. The implementation of such a feedback loop can be conventional as such.

However, the control unit 150 controls the motor 151, 152 by controlling a voltage applied to each of the stator 2 poles 7 as described above, using a variable voltage with a phase difference applied to different poles, as described above. This provides for a smooth and continuously regulatable feedback control, resulting in an agreeable user experience.

In parallel or, preferably, in series with said voltage-controlling feedback control loop, such as downstream of said voltage-controlling feedback control loop, the user settable speed drive pattern feedback control loop further comprises a feedback loop regulating a motor 151, 152 power consumption based upon a detected present motor 151, 152 usage of electric current, so that an increased current usage results in an increased power consumption. This additional feedback control loop, which as such may also be conventional, is preferably implemented in motor 151, 152 control circuitry within the motor 151, 152 itself.

Hence, the control unit 150 continuously regulates the voltage supplied to the motor 151, 152 so as to achieve the user-set velocity. At the same time, the motor 151, 152 current usage is monitored, and the instantaneous power consumption of the motor 151, 152 is regulated based upon the instantaneously used current. The combination of these two feedback control loops provide for a very efficient yet smooth control of the trolley 100 velocity. It is preferred that the latter feedback control loop, of the motor 151, 152 power consumption, is used also in other drive patterns so long as the motor 151, 152 power is active. The same motor current vs power feedback loop can, in fact, be active in the same way irrespectively of the type of drive pattern currently being implemented by the control unit 150.

Hence, the user settable speed feedback control will automatically reach and maintain the user-set trolley 100 speed. However, when the user tries to push the trolley 100 faster than the user-set speed, or when travelling downhill and the trolley 100 picks up speed above the user-set speed, it is preferred that the feedback control loop in said user settable speed drive pattern also comprises engaging a braking mechanism. This braking mechanism is preferably automatically activated when the user-set speed is exceeded by a predetermined relative or absolute value. In some embodiments, the predetermined value may be the absolute value "zero", meaning that the braking mechanism is automatically activated as soon as the detected speed of the trolley 100 surpasses the user-set speed. It is realized that the trolley speed, again, can be read using sensor 9.

In one preferred example of such braking mechanism, the motor 151, 152 is arranged to be driven in a generator mode. This generator mode involves an active control by motor 151, 152 control circuitry arranged in connection to the motor 151, 152 and/or by the control unit 150, which active control involves the control unit 150 actively controlling the direction of induced currents due to the forced rotation of the motor 151, 152 rotor 3 in relation to the motor 151, 152 stator 2, and feeding said current to the battery 156 for recharging the battery 156. In other words, the control unit 150 is arranged to set current directions to and from the stator 2 poles 7 in a pattern, as a function of the motor 151, 152 rotation, which corresponds to the supplied current when driving the motor 151, 152, so that a net current can be drawn from the stator 2 poles 7 and be supplied to the battery 156 for recharging the same. Hence, the said braking mechanism in this preferred case comprises the control unit 150 switching the motor 151, 152 into generator mode, and using the generated electric voltage to recharge the battery 156.

Another preferred example of such braking mechanism is that the trolley 100 comprises a mechanical brake (not shown in the figures) which is arranged to be activated by the control unit 150, and in that the said braking mechanism comprises activating said mechanical brake when the trolley 100 speed exceeds the user-set speed as described above. One preferred such mechanical brake is a sprint or the like which, by being pushed by an electromechanical force due to a voltage applied by said control unit 150, enters into a position in which it mechanically prevents at least one wheel 111, 112 from rotating, for instance by preventing the rotor 3 to rotate in relation to the stator 2 in at least one driving motor 151, 152. This way, an immediate stop is achieved if the detected trolley 100 speed exceeds a certain maximum speed, which may be dependent upon the user-set speed. The mechanical brake may also comprise a friction brake.

Preferably, a generator mode braking mechanism is combined with a mechanical brake, so that the mechanical brake is activated in case the generator mode braking mechanism is active but the trolley 100 speed is still above a certain predetermined value, which value may be dependent upon the user-set speed.

Another drive pattern is a free-wheeling drive pattern, in which the control unit 150 is arranged to not impart any propulsion force to the wheels 111, 112 and at the same time minimize the internal drive friction of the motor(s) 151, 152. Thereby, the trolley 100 behaves like a conventional non-motor propelled trolley. The free-wheeling drive pattern is preferably activated by the control unit 150 implementing to the motor(s) 151, 152 a corresponding freewheeling drive mode, preferably by simply switching off the voltage supplied to the motor 151, 152.

In particular, it is preferred that the free-wheeling drive pattern is not initiated by mechanically disengaging any part, such as the motor 151, 152 itself. Instead, the rotor 3 is preferably arranged to rotate in relation to the stator 2 when the trolley 100 freewheels.

According to a particularly preferred embodiment, the free-wheeling drive pattern is active as long as the main power to the control unit 150 is switched off. This is achieved by the motor being of the type described above, offering very low-friction free-wheeling when not supplied any pole 6, 7 voltage. The free-wheeling drive pattern may also be activated by actively manipulating a switch also when the general power to the control unit 150 is switched on. It is furthermore preferred that a feedback-assisted drive pattern is automatically activated as a result of the power to the drive unit 150 being switched on.

In general, in case the user-set speed is set to zero, the control unit 150 is preferably arranged to apply at least one of said braking mechanisms to the trolley 100, so as to keep it from moving without either pushing or pulling with some force, or setting the user-set speed to a non-zero value.

Preferably, in case at least one wheel axis 110 comprises one motor 151, 152 for each wheel 111, 112 on such axis 110, each such motor 151, 152 is individually controlled by the control unit 150 to maintain the said user-set speed for the wheel 111, 112 in question during the feedback-controlled propulsion mode.

There may be different types of feedback-controlled propulsion drive patterns, for instance selectable using control 157. For instance, a minimum-speed drive pattern may also be implemented by the control unit 150, in a way corresponding to the above-described user-set speed drive pattern.

Furthermore, in a preferred embodiment a motor 151, 152 driving force, by control of the control unit 150, is applied based at least partly on a torque sensor providing information to the control unit 150 regarding a non-zero torque applied to a user control, such as a rotating handlebar, comprised in the interface 153. In this case, the control unit 150 controls the motor 151, 152 to apply a non-zero driving force as long as a non-zero torque is sensed. Preferably, such an applied (by the user) torque is translated into a selected speed, by a translation algorithm in the control unit 150 which interprets a higher torque as a higher speed than the current rotation speed of the trolley 100. In other words, the user can control the set trolley speed, in relative terms as compared to a currently measured trolley speed, by applying more or less torque.

As an alternative or addition to this, a push force sensor, such as arranged in the trolley 100 handlebar 130, may be arranged to directly sense a pushing force applied by the user to the trolley 100, and only allow the control unit 150 to apply a driving force to the wheels 111, 112, via motor(s) 151, 152, in case a non-zero such pushing force is applied by the user. The pushing force sensor may be the same as the dead man's switch, or be used instead of the latter. The above-described braking mechanism may also be activated in case no such torque or pushing force, of at least a predetermined minimum magnitude, is applied, as a safety mechanism when the trolley 100 is parked.

In one preferred embodiment, the said torque sensor is arranged to discriminate between a backwards- and forwards directed torque, whereby the/each motor 151, 152 is arranged to be driven backwards or forwards during said feedback assisted propulsion drive pattern depending on the direction sensed by the torque sensor.

Alternatively, or in addition thereto, the control unit 150 may preferably be arranged to sense a rolling direction of the trolley 100 based upon information provided by said position or velocity sensor 9, and to implement said feedback assisted propulsion drive pattern in the said sensed rolling direction.

Preferably, the user settable feedback propulsion feedback pattern is implemented entirely or substantially identically for forward- or backward propulsion. Hence, if the user is conveying the trolley 100 forward and, using a pulling force, brings the trolley 100 to a halt and then pulls further to bring the trolley 100 to a backwards motion, the control unit 150 will automatically detect this change of rolling direction and instead regulate the motor 151, 152 with the aim of achieving and maintaining a backwards motion of the trolley 100. The aimed-for backwards motion speed may be the same as the user-set forwards speed, or a lower speed which may be predetermined or proportional to the user-set speed for the forwards propulsion case. Correspondingly, when the user again brings the trolley 100 to a halt and starts pushing it forward, the control unit 150 again automatically detects this and switches to a regulation again aiming at the user-set forward speed, as described above.

It is preferred that the program switch 157 can be used by the user to switch between different drive patterns. One such additional drive pattern is also the above-mentioned rocking drive pattern, which is implemented by the control unit 150 controlling at least one motor 151, 152 to propel the trolley 100 backwards and forwards according to a predetermined rotation pattern as a function of time.

Preferably, there are several such rocking drive patterns available, such as selectable using switch 157 once the trolley 100 has come to a standstill. Each such rocking drive pattern preferably comprises driving the trolley 100 in one direction forwards or backwards a certain distance, then driving the trolley 100 in the opposite direction a certain distance, and so on, indefinitely or during a predetermined maximum time period until the user terminates the rocking drive pattern, such as using switch 157.

Preferably, different such rocking drive patterns comprise different combinations of driving distances in both directions, accelerations when switching driving directions and driving speeds. According to one preferred embodiment, there are at least three different rocking drive patterns gradually varying from a smooth, slow rocking pattern, preferably with relatively longer driving distances in both directions, to a more harsh, fast and quirky rocking pattern, preferably with relatively short driving distances in both directions. Preferably, a series of rocking programs can be implemented, varying from a forwards/backwards motion of less than 5 cm up to a forwards/backwards motion of more than 20 cm, preferably with an associated decreasing rocking frequency and preferably also rolling speed between turns.

Normally, a rocking driving pattern will comprise driving motions straight forward and backward of the trolley 100. According to one preferred embodiment, at least one rocking driving pattern however comprises driving one wheel 151, or the wheels on one side of the trolley 100 in one direction, possibly while driving an opposite wheel 151 or wheels at another speed or in the other direction, so as to achieve a side-ways rotation motion, preferably in the form of a quick quirk of the trolley 100. Such side-ways rotations may be implemented as a rocking drive pattern in and of itself, but are preferably implemented as a part of another rocking drive pattern which is based upon a pure forwards/backwards motion. For instance, every five forwards/backwards rockings, or at irregular intervals, one or several side-ways quirks will be imparted to the trolley 100 by the control unit 150. This provides a less predictable and uniform rocking function, which may be advantageous to both children, biological samples etc.

It is preferred that the said rocking drive patterns, as is the case for all drive patterns described herein, as concerns the functionality difference between these programs, are implemented in software, preferably purely in software, and executed by the control unit 150 using the same hardware.

As described above, the trolley 100 is preferably arranged with a dead man's switch 154. T the control unit 150 is arranged to apply a braking mechanism of the said type in case the dead man's switch 154 is activated when the control unit 150 is powered and the information from said position or velocity sensor indicates that the trolley is currently moving.

Above, preferred embodiments have been described. However, it is apparent to the skilled person that many modifications can be made to the disclosed embodiments without departing from the basic idea of the invention.

For instance, much of the functionality described above, at least the battery 156, the control unit 150 and the motors 151, 152, can be encapsulated in an axis 110, which is then connected in a suitable way to an external user interface 153 for mounting on the handlebar 130. That way, the existing axis of an existing trolley can be replaced with an axis providing the functionality of the present invention. As a result, an existing trolley may easily be upgraded to become a trolley 100 according to the present invention.

There may be many more drive patterns, apart from the above described. For instance, one drive pattern may, when activated, propel the trolley 100 a predetermined distance forward, and the stop. Dive patterns may be added to the trolley 100 by upgrading the software, in a way which may be conventional as such, such as wirelessly over a WiFi internet connection and using the control unit 150.

In order to keep the trolley 100 from displacing too much from its parked position when implementing a rocking drive pattern, such rocking drive pattern is preferably always implemented during a maximum time period of not more than 30 minutes. However, it is also possible to use a specific mechanism for keeping the trolley 100 in roughly the same position, around which position the rocking is performed. Examples comprise arranging a digital camera looking downwards, capturing an image of the floor on which the trolley 100 moves; to, using conventional image interpretation algorithms, continuously or intermittently determining a position of the trolley 100 in relation to a determined fixed reference position; and imparting correcting adjustments to the wheels 151, 152 during the rocking motion so as to roughly keep the trolley 100 in the same position relative said fixed reference position over time.

Furthermore, it is possible to arrange the trolley 100 with interchangeable main bodies 120 on the same chassis 101, so as to allow a user to switch between a child's support main body 120 and a shopping carriage main body 120, without necessarily installing support for a different set of drive patterns.

It is in general preferred that there is no torque sensor installed in the motor as such, for sensing a torque which is applied externally to the motor and for use in a propulsion feedback mechanism. The reason for this is that the above described motor current vs power feedback loop will effectively act as a feedback loop acting based upon an indirectly sensed externally applied motor torque, namely indirectly measured via the measured motor current.

Hence, the invention is not limited to the described embodiments, but can be varied within the scope of the enclosed claims.

The invention claimed is:

1. A self-propelling trolley assembly, comprising:
   a battery;
   at least one wheel that is driven by an electric motor, the electric motor is powered by said battery;
   a rotation position or velocity sensor positioned on the trolley to sense a rotation position or rotation velocity of at least one wheel;
   a user interface; and
   a control unit that regulates the electric motor based upon input from said user interface so as to affect a rotation of said driven wheel according to plural drive modes, the drive modes including: i) a feedback assisted propulsion drive mode, based upon feedback from said position or velocity sensor; ii) a freewheeling drive mode; and iii) a rocking drive mode,
   wherein each drive mode is implemented using a different drive voltage pattern to said electric motor, and
   wherein the electric motor has a number of stator poles and a number of rotor poles, the number of stator poles is not an integer multiple of the number of rotor poles, and
   wherein the stator poles are grouped into at least three magnetically and electrically identical subsets that are mounted one after another in an angular direction of the electric motor.

2. The self-propelling trolley assembly according to claim 1, wherein the position or velocity sensor is a hall effect sensor, arranged to provide the control unit with rotary motor position or velocity information.

3. The self-propelling trolley assembly according to claim 1, wherein the trolley assembly is a children's stroller.

4. The self-propelling trolley assembly according to claim 1, wherein the trolley assembly is a transport trolley for liquid samples.

5. The self-propelling trolley assembly according to claim 1, wherein the control unit is further arranged to implement a user settable speed drive mode, wherein in the user settable speed drive mode, the control unit continuously measures a speed of the trolley and compares the measured speed to a user-set speed, and regulates a voltage supplied to the motor from the battery according to a feedback loop so as to achieve said user-set velocity.

6. The self-propelling trolley assembly according to claim 5, wherein the feedback control loop in said user settable speed drive mode regulates a motor power consumption based upon a detected motor current usage, so that an increased current usage results in an increased power consumption.

7. The self-propelling trolley assembly according to claim 5, wherein the feedback control loop in said user settable speed drive mode engages a braking mechanism when the user-set speed is exceeded by a predetermined relative or absolute value.

8. The self-propelling trolley assembly according to claim 7, wherein the motor is arranged to be driven in a generator mode, and generated electricity recharges the battery.

9. The self-propelling trolley assembly according to claim 8, wherein the generator mode is implemented by the control unit by actively controlling the direction of induced currents due to the forced rotation of the motor rotor in relation to the motor stator and feeding said current to the battery for recharging the battery.

10. The self-propelling trolley assembly according to claim 7, wherein the braking mechanism is a mechanical brake activated by the control unit.

11. The self-propelling trolley assembly according to claim 1, wherein the freewheeling drive mode is implemented by switching off a voltage supplied to the motor.

12. The self-propelling trolley assembly according to claim 1, wherein the control unit is arranged to discriminate between a backwards- and forwards directed rotation of the trolley assembly, and the motor is arranged to be driven backwards or forwards during said feedback assisted propulsion drive mode depending on the sensed rotation direction.

13. The self-propelling trolley assembly according to claim 1, the control unit is arranged to sense a rotation direction of the trolley based upon said sensor feedback, and to implement said feedback assisted propulsion drive pattern in the sensed rotation direction.

14. The self-propelling trolley assembly according to claim 1, wherein the rocking drive mode is implemented by the control unit by controlling the motor to propel the trolley assembly backwards and forwards according to a predetermined rotation pattern as a function of time.

15. The self-propelling trolley assembly according to claim 1, wherein the trolley comprises a dead man's switch, and the control unit is arranged to apply a braking mechanism in case the dead man's switch is activated when the control unit is powered and the feedback from said position or velocity sensor indicates that the trolley is currently moving.

* * * * *